Nov. 5, 1957  C. B. HEMMING ET AL  2,812,277
DECORATIVE LAMINATED COVERING MATERIAL AND METHOD OF MAKING SAME
Filed March 20, 1953  2 Sheets—Sheet 1
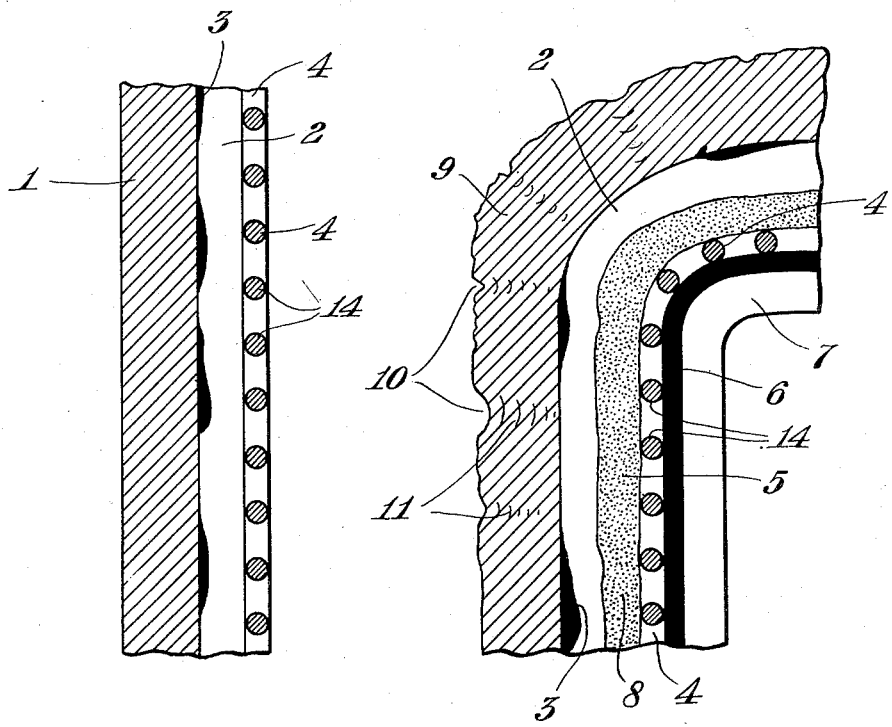
INVENTORS.
CHARLES B. HEMMING,
WILLIAM H. SHEFFIELD,
GEORGE T. BROWN JR.
James M. Heilman
ATTORNEY.

Nov. 5, 1957  C. B. HEMMING ET AL  2,812,277
DECORATIVE LAMINATED COVERING MATERIAL AND METHOD OF MAKING SAME
Filed March 20, 1953  2 Sheets-Sheet 2

INVENTORS.
CHARLES B. HEMMING,
WILLIAM H. SHEFFIELD,
GEORGE T. BROWN JR.
James M. Heilman
ATTORNEY.

United States Patent Office 2,812,277
Patented Nov. 5, 1957

2,812,277

DECORATIVE LAMINATED COVERING MATERIAL AND METHOD OF MAKING SAME

Charles B. Hemming, New Rochelle, N. Y., William H. Sheffield, West Englewood, N. J., and George T. Brown, Jr., Louisville, Ky., assignors to United States Plywood Corporation, New York, N. Y., a corporation of New York Application March 20, 1953, Serial No. 343,724

11 Claims. (Cl. 154—102)

This invention relates to plastic sheeting or film generally and particularly to transparent or substantially transparent vinyl sheeting and the process for converting it into a decorative material. The invention relates more specifically to an elastomeric vinyl sheet which, while it can be used as a covering for traveling bags, cases, cabinets, floors, etc., is specifically designed and constructed so that, if desired, it may be successfully applied as a permanent wall or ceiling covering to thereby eliminate the necessary expense and trouble of repainting and repapering, and, most advantageously, as upholstery material having the proper degree of durability, elasticity, hand, and tensile strength. These characteristics also permit the material to be used instead of leather, textile material and the like. The present application is an improvement upon the laminated article and method of preparing the same disclosed and claimed in U. S. patent application Serial No. 152,157, entitled "Plastic Sheet and Process for Manufacturing Same," filed March 27, 1950, and issued as Patent No. 2,714,559 on August 2, 1955.

Prior to the invention set forth in the aforesaid application, Ser. No. 152,157 (Patent No. 2,714,559), and the present invention, the usual method of producing a colored vinyl sheet has been to compound the desired coloring pigments with the vinyl resin base compound and then to calender or cast the sheet with suitable equipment. The resultant product has substantially the same color throughout and, since it is almost completely opaque, the color has no apparent depth. In an attempt to achieve some illusion of depth and to obtain a combination of colors, the prior art also has been to print, mold, cast, transfer, or otherwise to apply, additional colors to the outer or finished side of the opaque sheet. Since these secondary colors are on the outer or wearing surface, they are removed readily, when the material is in use, by wear, abrasion, or solvents. In addition the exposed colored face may be adversely affected by contacting constituents, such as, for example, sulfur gases in the atmosphere in industrial areas, strong alkaline cleaning soaps, or acidic disinfectants.

From the standpoint of merchandising and utility, the prior products have six major disadvantages which are now described herein. Firstly, to manufacture the prior products economically, it is necessary to make relatively large quantities or batches of material having the desired color. Secondly, if colors or printed patterns or other effects are applied to the face of the sheet, they are subject to abrasive wear or removal by solvents. Thirdly, when embossed and printed, the resultant sheet lacks depth and character. Fourth, the color being on the face, is more openly exposed to the deleterious effects of chemical action by its accessibility to industrial atmospheres, cleaning compounds, or commonly used disinfectants. The fifth and sixth disadvantages of the prior products will appear from the following discussion:

It has been found useful to provide vinyl sheetings with some type of fibrous backing material. One purpose for providing fibrous backing material for the prior products was to permit adherence of the sheeting to the surface on which it is being applied (such as, for example, upholstered furniture or a wall), by a suitable adhesive. Direct application of the adhesive to the rear surface of the sheeting has been found to pose two problems. The first problem was the difficulty of choosing an adhesive which would properly adhere both to the vinyl sheeting surface and to the multiplicity of diverse surfaces to which various users might wish to apply the sheeting. Concomitant with this problem was one of choosing such an adhesive which has the required characteristics just referred to, but in addition, does not stain or otherwise discolor the sheeting. This compound problem has always been difficult to solve directly. Hence, in an effort to avoid the problem, there evolved the provision of a fibrous backing material for the vinyl sheeting which is adhered to the sheeting in the manufacture thereof and may later be the medium by which the sheeting is adhered to a surface by any number of suitable adhesives since the characteristics of adherence to the sheeting per se and the staining thereof are no longer important. However, the application of the backing material to the sheeting in turn raised its own problems as will now be pointed out below.

In the prior products, the fibrous backing material has been calendered with or onto the vinyl sheeting so that the material is partially embedded in the very body of the sheeting itself. Accordingly, as a fifth disadvantage, the fibrous material has a tendency to cause raising or irregularities in the visible wear surface of the sheeting coinciding with the fibers or fiber pattern of the material. These raisings or irregularities are detrimentally noticeable in varying degrees dependent upon manufacturing variables, color choice, design of the vinyl sheeting, and characteristics of the backing material used.

The sixth disadvantage of the prior products relates directly to the chief reason for employing an extensible fibrous material, and more particularly, an elastic cloth fabric for the backing material instead of the flocking material referred to in U. S. patent application S. N. 152,157, already noted herein. Specifically, a backing has been sought which would result in a strengthened vinyl sheeting laminate that would, however, have the required characteristic of flexibility and elasticity with concomitant characteristics of sufficient extensibility and lateral compressibility necessary for proper application of the sheeting upon contoured surfaces such as encountered in upholstered furniture and the like.

In order to minimize the visible effect at the surface of the sheeting due to possible small irregularities in the supporting surface such as bumps, lumps, or other short protuberances, it is desirable that the backing also have the characteristic of compressibility in the direction of thickness as well as in the lateral direction already noted.

When the fibrous material is calendered directly to the vinyl sheeting as part of the method already disclosed to be the prior art of manufacturing vinyl sheeting, the threads, usually comprised of fibers, of the backing material, are partially embedded and held by the very body of the sheeting itself. Accordingly, when the backed sheeting is stressed until it tears, the individual threads or fibers are severally torn while the adjacent threads or fibers are comparatively rigidly held in position by the substantially non-elastic and non-yielding body of the vinyl sheeting per se. The result is that such laminated sheets offer very little increase in resistance to tearing than is inherent in the strongest layer of the laminate. Thus the vinyl sheeting body will offer the tearing resistance of the vinyl body per se plus the strength of the comparatively small number of fibers contained in a single thread until the thread breaks whereupon the peak stress will be transferred to the next succeeding thread. This defect is particularly disadvantageous where the sheeting is to be used as an upholstery material and therefore subject to stretching manipulation in the application and use thereof as already mentioned herein.

What further emphasizes the seriousness of this defect is that a multiplicity of focal points for tearing are naturally set up when the upholsterer's usual tacks are used to fasten the sheeting to the furniture and the sheeting, usually with cut notches for fitting purposes, is then stretched to follow the contours thereof.

In consideration of the foregoing enumerated disadvantages of the prior art, it is a major object of the present invention to use an elastic fibrous backing on the rear surface of a vinyl sheeting so as to make the same commercially applicable to a supporting surface, and as a protection for the color coat.

It is another major object of this invention to provide a particular cloth backing on the rear surface of a vinyl sheeting adhered thereto in a specific manner so that the sheeting may have the flexibility, elasticity, extensibility, compressibility and "hand" particularly desired for its use in upholstery and related uses while affording anti-tear characteristics not heretofore found in the art.

It is another object of the invention to apply a color or colors to the reverse or non-wearing surface of a substantially transparent sheet or film so as to protect such color or colors.

It is another object of the present invention to produce by spraying, transparent, translucent, reflective, or opaque materials as an "antique" effect into spots, streaks, or patterns, as a first coat before the color coat or coats are applied.

Another object of the invention is to emboss the face or wear side of the vinyl sheeting so as to produce surface texture, grain, or pattern.

It is still another object of the invention to enhance the visual characteristics of the sheeting by augmenting the hiding power for the elastic fibrous backing of the sheeting by greatly increasing the hiding power or opacity of one of the color coats applied.

It is still another object of the invention to provide a means for readily obtaining any desired color or combination of colors suitable for decorative and utilitarian purposes so that the finished product will have a depth of color which will measurably increase its beauty and attractiveness and still be able to be manufactured economically in either small or large quantities.

It is still another object of the invention to provide a decorative material in which a purchaser may obtain his pattern, design, combination of colors or decorative effect in a small production quantity known to the industry as "cut lots." This, in effect, defines the material as a medium of expression so highly desired and prized by designers, decorators, architects, etc.

With the foregoing and other objects in view as will appear from a reading of the following specification and claims, the invention resides in the novel arrangement and combination of parts and in the details of construction and process of manufacture herein-after described and claimed, it being understood that changes in the precise embodiment of the invention may be made within the scope of what is claimed without departing from the spirit of the invention. It will be further understood that our invention is susceptible of embodiment in many and various forms, some of which are illustrated in the accompanying drawing, and that the structural details or particular steps of the method herein set forth may be varied to suit particular purposes and still remain within our inventive concept.

In the drawings:

Fig. 1 illustrates an enlarged cross-sectional view of a substantially transparent plastic film having a single color, of one or more coats, on its non-wearing or rear surface. Material so treated might be used for upholstery, etc., in certain cases where the tear strength of the material is not as important as it is customarily.

Fig. 2 illustrates an enlarged cross-section of the same type material which has been "antiqued" or two toned by having a varied mist coating and a color coat applied thereto, after which a fibrous backing is placed onto the basic color coat while it is still wet or adhesive so that the backing material will become partially embedded in the surface of the color coat.

Figure 4:
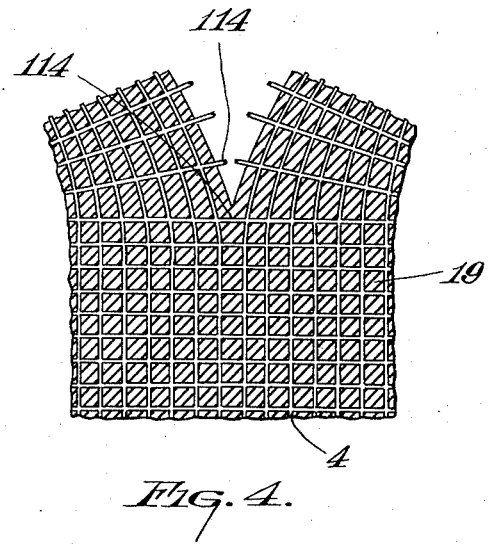

Fig. 3 discloses an enlarged cross-sectional view of a variation of the above construction as applied in one manner possible to a contoured supporting surface 7. The surface of the sheeting 9 is shown debossed 10 to produce an aesthetic or functionally useful surface textured effect, and the backing material 4 is applied to an adhesive 6. For clarity, the various coats, i. e., 2, 3, 5, and 6, are enlarged relative to the plastic sheet and backing material, and the debossed and undulating surfaces of the plastic sheet are exaggerated. By the term "debossed" is meant the opposite of "embossed." That is, instead of having the surface of the sheet 9 raised into bosses or protuberances, the surface is depressed as at 10.

The construction illustrated in Figs. 2 and 3 could be used for covering rigid supporting surfaces, such as walls, cabinets, cases, traveling bags, etc., as readily as for application to upholstery which, commonly, is accomplished by means of tacks, staples, or other fastening means instead of by adhesives. Alternatively, the tacks or other fastening means may be used in conjunction with adhesives.

Fig. 4 is a schematic representation of the rear surface of a vinyl sheeting of the prior art wherein the backing material is calendered thereto and showing the manner in which the threads are separately and sequentially ruptured or torn upon the application of a tension or shearing stress.

Figure 5:
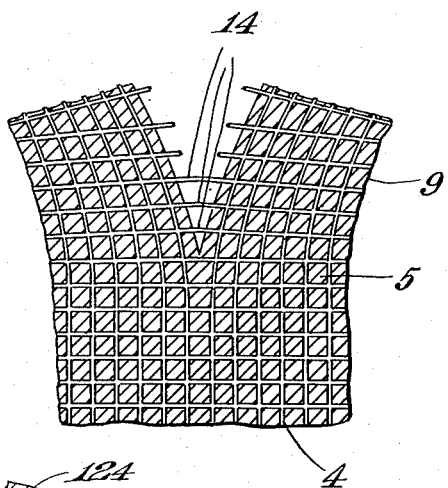

Fig. 5 is a schematic representation of the rear surface of a vinyl sheeting of the present invention upon which rear surface has been applied a backing material and showing the manner in which a tensile or a shearing stress is distributed over a plurality of threads so that each augments the others.

Figure 6:
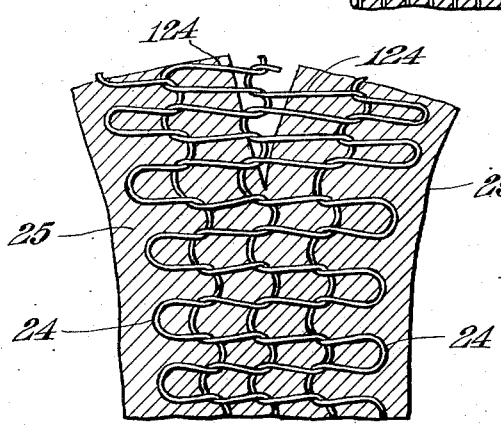

Fig. 6 is a schematic representation, similar to that of Fig. 5, of the rear surface of a vinyl sheeting upon which has been applied a backing of knitted material in accordance with the preferred embodiment of the invention.

Referring now to the above designated figures of the drawings, a transparent, substantially transparent, or highly translucent sheet of vinyl resins compounded with suitable plasticizers and stabilizers 1 has applied to what may be designated the rear surface, such color 2 pattern or combination of colors and patterns as may be desired. The types of construction shown in Figs. 2 and 3 are particularly suitable for upholstery or other work in which the material will be nailed rather than glued to the object to be covered which has other than a perfectly flat contour. The type of construction shown in Fig. 1 may find use in covering such flat contours where stretchability is not an important factor.

The thickness of the transparent, substantially transparent, or highly translucent sheet may be varied, depending upon its application. For example, for very heavy duty such as a floor covering or bin covering it should be approximately .040″ thick, for heavy duty such as a wall covering approximately .022″ thick, while for light duty, such as book covers, it might be approximately .012″ thick or even lighter. The color and adhesive coats i. e. 2, 3, 5, and 6, are approximately .002 to .005 inch thick for best results.

In ordinary practice the basic color layer 2 is one color but may consist of intermingled colors in either random or controlled patterns. It may be sprayed or applied by other means such as by printing processes, coating processes, transfer processes, or laminating processes. For illustration, successive banks of sprayers may be used so that the number of banks and number of sprayers in each bank may be controlled severally to vary the thickness of the coating, translucence of the coating, or to obtain various unique optical or color effects in the structure of this particular color layer.

In order to obtain other useful optical effects or color combinations it has been found desirable to add, in addition to the basic color layer 2, a thin mist-like deposit 3 in irregularly sprayed or otherwise irregularly deposited form directly on the sheet in either random or controlled manner to obtain an unusually attractive two-tone or "antique" finish in either a random or controlled pattern. This antiquing may comprise one or more subcoats and one or more materials or colors on the surface of the sheet. The more contrasting the "antiquing" color or material is to the background color or material, the more striking the effect.

If desired, a backing material 4 of any suitable material, i. e., cellulosic cotton, wool, rayon, nylon, etc. (and any method of manufacturing the material, i. e., knitted, tricot, woven, etc.), may be attached directly to the outer surface of the color coat or coats 2 or onto the adhesive 5. However, in the preferred embodiment of the invention the material is chosen for its inherent characteristics, especially extensibility, elasticity and strength. Materials which have been found to be admirably suited for the purpose are knitted materials because of this high degree of extensibility. Other fabrics, knitted, woven, felted, or cemented non-woven, such as unidirectional fibers, particularly glass fibers may also be used as long as the above noted characteristics of extensibility, elasticity and strength are provided. Thus, for example nainsook, light cable duck, monks cloth, twilled weave, double or triple type weave have likewise been found to be quite suitable.

Regardless of the particular material chosen for its inherent characteristics, one side surface of the material is adhered to or into the color or adhesive coat in a controlled or limited manner, while the other side of the material may serve to provide a good surface for an adhesive in those cases where one is used, such as the bonding mastic or adhesive 6 which is shown by way of example in Fig. 3 as applied to the surface 7.

While a clear elastomeric adhesive 5 may be used to adhere the backing material, it has been found desirable to pigment this adhesive with aluminum or other reflective pigment in order to increase opacity and hence hiding power for the visual characteristics of the supporting surface to which the sheet is adhered. This reflective pigmented adhesive layer may also be used advantageously to improve or modify internal optical characteristics of the laminated construction.

This aluminum pigmented adhesive may be dispensed with and the desired opacity and hence, hiding power of the sheeting may be achieved in another manner. In essence, the procedure is first to apply the basic color coat (after the application of the mist 3 if such is employed at all). This basic color coat will be the one desired to be shown through the sheeting 9. Most often the particularly desirable rich hues will be rather expensive. Hence, as a practical matter, it is desirable to apply the basic coat as thin as practicable. However, almost invariably, the thinness of the coat will result in a certain translucency so that blemishes behind it, such as may be present on the supporting surface, will show through in an unsightly manner. In accordance with this feature of the invention, the more expensive coat need not be applied in a thicker layer. Instead, a second layer of a cheaper color coat having merely a similar hue may be applied over the thin layer of desired hue to the point of opacity. This results in the desirable color depth richness while all supporting surface blemishes are effectively hidden. At the same time the cost is kept to a minimum.

In accordance with one embodiment of the invention illustrated generally in Fig. 3, the adhesive resin 5 is chosen so that it has sufficient elasticity and elongation to permit some amount of displacement of the individual threads 14 of the backing material 4 along the rear surface of the vinyl sheeting 9 in response to stretching and shearing stresses as indicated in Fig. 5. The elasticity is preferably chosen so that the individual threads 14 of the normally stretchable backing material 4 (in the region nearest the point at which the stress is applied) are not caused to be stretched to the extent of their breaking point as is the case illustrated in Fig. 4 which is a schematic representation of the calendered vinyl laminate or coated fabric of the prior art.

In Fig. 4 (of the prior art) the threads 114 of the backing material 4 embedded in the vinyl sheeting 19 are clearly shown to be broken essentially as the stress is progressively applied along the sheeting. A similar result would occur in connection with a knitted backing, such as illustrated in Fig. 6, if the various threads were embedded in a calendered or coated sheeting instead of being laminated thereto. In accordance with the present invention, because of the selected properties of the elastomeric adhesive 5 coupled with the inherent stretchability of the backing material 4, the tensile limit of any given thread 14 is not reached before the applied stress is distributed to several other adjacent threads 14 as schematically indicated in Fig. 5.

Moreover, in the optimum relationship, the ultimate bonding strength of the elastomeric adhesive 5 should be less than the tensile strength of the individual threads 14 of which the backing fabric 4 is made. In this manner (and this critical control between these two elements is one of the important features of the invention) if the elastic limit of the adhesive 5 in a localized region is reached, breakage of the adhesive bond occurs prior to tearing of the particular threads 14 held by such bond, but during the additional stretching of said threads. By controlling the ratio of ultimate adhesive bond strength to effective thread strength it is possible to obtain the greatest adherence possible without sacrificing appreciably the inherent strength of the backing material or the advantages of the present invention. As an overall result, the stretching or tearing stress is transmitted to a plurality of individual threads 14 at the same time rather than to one at a time, as indicated at 114 in Fig. 4 which is, as noted before, a schematic representation of the prior art. Therein, each thread 114 is held fast in the vinyl body to which it has been calendered so that there is individual rupturing upon application of a sufficient stress which will obviously be below that necessary to tear a plurality of threads at the same time as indicated in Fig. 5.

In accordance with a preferred embodiment of the invention disclosed generally in Fig. 6, the backing material chosen is a knitted material which has inherent extensible characteristics due to deformation of the loops 24 upon the application of stresses thereto as seen at 124 in Fig. 6. As in the case described supra with reference to Fig. 3, an elastic adhesive 25 is chosen. However, in this case, the inherent elasticity or extensibility of the threads 24 per se need not be greater (but obviously may be greater) than that of the adhesive. The extensibility of the loops as shown in Fig. 6 is sufficient to obtain a similar and, in fact, a more efficacious action. That is, upon the application of a tearing stress to the material, the elasticity of the adhesive 25 permits the relative movement of the threads 24 on the rear surface of the sheeting 9 to achieve the deformation shown at 124. It will be apparent that after such deformation, the stress is distributed over a plurality of threads 124 of the knitted backing rather than to one at a time as in the case of the prior art illustrated in Fig. 4.

This elastomeric adhesive is also chosen to permit the same to bond the backing material to the sheet without causing discoloration or disturbance of the color coatings or of the sheet itself. A suitable adhesive which has been found to provide the foregoing functions when used as the adhesive for the circularly knit cloth referred to herein as one of the preferred backing materials is commercially known as "Geon 552 Latex." This is a water dispersion (approximately 50% solids) of a vinyl resin plasticized by the use of a special Hycar nitrile rubber during manufacture. The Geon (polyvinyl chloride) to Hycar (butadiane-acrylonitrile) ratio should be about 55 to 45. Other suitable adhesive resins are polyvinyl chloride, polyvinyl chloride-acetate, polyvinyl chloride-acetate-maleate, polyethyl acrylate, and butadiene-acrylonitrile. Either solvent solutions or latex emulsions or dispersions of these polymers have been found suitable. It will be obvious to those skilled in the science of adhesives that there are innumerable other polymers, copolymers, and inter-polymers probably equally suitable or even more suitable for specific applications. The preceding list of resins has been tested over an extended period of time and are known to be satisfactory for general use.

Another function of the backing material, especially when suitably colored, is that when colors of low opacity are employed, such backing material increases the hiding power and makes the colors appear purer when the sheeting is held against a dark background. It is understood, of course, that the bonding adhesive or mastic 6 in those cases where it is indicated could as easily be first applied to the material as to the surface which it is desired to cover.

It is preferred that the plastic sheeting be rolled and shipped like wallpaper. In those cases where the mastic 6 is used, it may be applied at the time the sheeting is to be applied to the supporting surface to be covered. It may be applied to either or to both surfaces prior to closure of the joint. However, if desired, the sheeting could be sold with a pressure sensitive adhesive applied to the outer surface of the backing material during manufacture, or with an adhesive needing heat as from a hot iron or other source to bond the assembly to upholstery, a wall of a building, cabinet, or receptacle, or other surface, and thereby eliminate the mastic 6 on the job in all cases. Alternately, the sheeting may be used with an adhesive which is to be reactivated with solvents or tackifiers at the time of installation. Of course, the sheeting may be applied to surfaces, such as in upholstery, with no other means than the usual upholsterer's tacks or similar mechanical fastening means.

As illustrated in Fig. 3, the sheeting 9 may be embossed to give it a raised textured or grained effect, for example, to resemble leather. Whereas, the sheeting illustrated in Figs. 1 and 2 is plain, the material in Fig. 3 is wavy throughout and at certain areas is debossed as at 10 which sets up pressure lines or zones 11 from the face to the rear surface along the line of the debossing. In certain cases the debossing causes a distortion of greater or lesser degree on the reverse surface. These pressure lines and the distortion, if any, in the rear surface causes the light rays to be slightly distorted and thereby enhances the results. A certain degree of residual internal stress causes the optical phenomenon of birefringence to become apparent within the clear material in the debossed areas to also enhance the result and add to the apparent "depth" of the color.

Since the basic material is a relatively clear sheet, it is apparent that either large or small quantities of any desired color can be produced economically and without significant waste. Because the color or colors are observed through a transparent film, thus giving the impression of depth, the product produced by this method is much more brilliant and attractive than any made by the prior art. This phenomena is achieved mostly due to the high refractive index (approximately 1.53) of vinyl film through which the light rays must pass. In other words, the color is reflected from the rear and has been modified and given depth by the particular characteristics of the vinyl film.

All color and/or color patterns are applied to the back of the sheet, where they are protected from wear by the thickness of the vinyl sheet itself. The color cannot be worn off or be removed by solvents since it is protected by the clear sheet, and, in fact, the color coating actually becomes a part of and adds to the basic strength of the clear sheet.

The addition of the elastic supporting surface to the back of unsupported vinyl sheeting in the form of the elastic fabric in accordance with the invention is absolutely essential for satisfactory installation in the upholstery field contemplated by the invention. The backing fabric also makes it possible to attach, easily and inexpensively, a gummed tape or fabric tape or web as a reinforcing member especially at seams, welts, and tacking or other highly stressed edges or points. This treatment may in certain cases be used to augment the elimination of the one major disadvantage of unsupported vinyl sheeting, namely, the tendency to tear as a result of tiny cuts or tears started by sewing or tacking. However, as already pointed out, the tear strength of the sheeting is brought up to a value which will withstand all normal use as an upholstering material by the backing fabric of the present invention.

This construction is also of advantage in the wall covering field wherein the vinyl sheeting may be applied not only to porous supporting surfaces, such as, plaster, lumber, plywood, plaster boards, and composition boards, but also to non-porous surfaces, such as, metal, high or low pressure laminates, and other plastic sheetings.

The general steps for preferred processing of the material (as in Fig. 3) are as follows:

(1) The vinyl material is first properly compounded and then the resulting vinyl resin compound is calendered or otherwise formed into clear, flat sheet form.

(2) If a textured design is desired, the calendered sheet is embossed on what will be its face surface while it is heated enough to emboss properly. This step may be omitted.

(3) If an "antique" or two-tone effect is desired, the calendered sheet is sprayed on its rear surface with a mist coating which will provide color in spots or streaks so that a non-uniform thickness of color occurs. This step may be omitted.

(4) A basic color coat of one or more subcoats is applied.

(5) An opaque reflective pigmented adhesive coat is applied.

(6) An elastic fibrous backing material is placed over the adhesive coat while it is still wet or tacky.

(7) Controlled pressure is applied to partially embed the threads of the backing fabric in the tacky adhesive.

(8) The sheet is backed so that a final fusion of the applied coatings and the vinyl sheet will occur.

(9) The sheet is festooned to remove any residual vapors or odors.

(10) The sheet is then vacuum cleaned to remove any loose lint or dirt and wound into rolls.

(11) The sheet is rewound for inspection, storage, and shipment.

It is thus seen that an upholstery and wall covering of protected and outstanding beauty has been produced which, moreover, may be easily applied. The upholstery and wall covering has no odor, is chemically inert, if soiled can be easily cleaned, has high water resistance, excellent toughness and superior flexibility, will not support combustion, and is resistant to aging and weathering.

The four main functional features of this material are:

(1) Maintenance is eliminated or substantially reduced because dirt, finger, heel, and scuff marks will not show. Powerful cleaners, detergents, and alkalies are unable to affect the color coat.

(2) Since small lots are economically feasible, an extended range of color depth and expression is obtainable by decorators.

(3) The sheeting may be applied and stretched around contours as a tacked upholstery covering with the danger of tearing and tear progression is eliminated or substantially minimized.

(4) The speed and completeness of recovery of the sheeting to its initial flat form after preliminarily shaping it to the upholstery, etc. to be covered is very much greater than similar materials due to its particular laminated construction; thereby permitting mistakes of the upholstery craftsman to be readily and easily corrected without any residual deformation of the sheeting.

The foregoing invention is described in detail in connection with transparent vinyl sheeting, and particularly in connection with transparent copolymers of vinyl chloride and vinyl acetate, polyvinyl chloride, polyvinyl acetate, and polyvinyl acetals. However, the best results, based on present day commercial materials, are obtained when copolymers of vinyl chloride and vinyl acetate containing 93% or more by weight of the polyvinyl chloride component are used.

Where a dull or mottle finish is desired, a translucent vinyl sheet may be used. However, the invention has its greatest usefulness, producing its most brilliant color and most startling and apparent result in connection with the more transparent polyvinyl chloride sheetings. However, somewhat the same results may be achieved, although generally to a lesser degree, by the use of other types of plastic sheeting, such as, (1) Vinylidene chloride
(2) Vinylidene chloride—vinyl chloride
(3) A copolymer of butadiene-acrylonitrile and vinyl chloride
(4) Isobutylene styrene copolymers
(5) Copolymers of cyclopentadiene with isobutylene and styrene
(6) Polyester types (such as "Mylar" film)
(7) Fluorinated resin (such as Exon 400 XR–61 film)
(8) Copolymer of vinyl acetate—acrylonitrile (Acrilan)
(9) Polyethyl acrylate film
(10) Chloro acrylate sheet Obviously, the various features mentioned in connection with one specific type product may be readily used in another. For example, the sheeting illustrated in Figs. 1 and 2 might be embossed, the construction of Fig. 2 could have the backing material applied to an added adhesive similar to Fig. 3, the mist or two tone color 3 in Fig. 3 could be eliminated, a design or pattern could supplant or be supplementary to one or both color groups etc.

What we claim is:

1. A decorative covering comprising a vinyl plastic sheeting, a coloring medium for said sheeting which is visible from the wear surface side of said sheeting, and an elastic cloth backing attached to the other surface of said sheeting by means of an adhesive, said adhesive having a bonding strength less than the tensile strength of the individual threads of said elastic cloth whereby said covering may be stretched and otherwise made to conform with the configuration of the surface to which it is applied and attached to such surface without tearing.

2. A decorative covering as specified in claim 1 wherein the elastic cloth backing comprises a knitted material.

3. A decorative covering comprising a vinyl plastic sheeting having optical characteristics within the range of translucency to transparency, a coloring medium applied to that surface of said sheeting which is opposite the wear surface thereof whereby said coloring medium is protected against wear, but is visible from said wear surface side, and an elastic cloth backing attached to said coloring medium by means of an adhesive, said adhesive having a bonding strength less than the tensile strength of the individual threads of said elastic cloth whereby said covering may be stretched and otherwise made to conform with the configuration of the surface to which it is applied and attached to such surface without tearing.

4. A decorative covering comprising a plastic sheeting in the range of .010" to .040" having optical characteristics within the range of translucency to transparency, an adhesive coloring medium applied to that surface of said sheeting which is opposite the wear surface thereof whereby said adhesive coloring medium is protected against wear, but is visible from said wear surface side, and an elastic cloth backing adhered to said adhesive coloring medium, the bonding strength of said coloring medium being less than the tensile strength of the individual threads of said elastic cloth whereby said covering may be stretched and otherwise made to conform with the configuration of the surface to which it is applied and attached to such surface without tearing.

5. A decorative covering comprising a vinyl plastic sheeting having optical characteristics within the range of translucency to transparency, a coloring medium applied to that surface of said sheeting which is opposite the wear surface thereof whereby said coloring medium is protected against wear, but is visible from said wear surface side, and an elastic cloth backing attached to said coloring medium by means of an adhesive in which said cloth backing is partially embedded, said adhesive having a bonding strength less than the tensile strength of the individual threads of said elastic cloth whereby said covering may be stretched and otherwise made to conform with the configuration of the surface to which it is applied and attached to such surface without tearing.

6. A decorative covering comprising a vinyl plastic sheeting, a coloring medium for said sheeting which is visible from the wear surface side of said sheeting, and a flexible elastic backing attached to the other surface of said sheeting, said backing being compressible both in the lateral direction and the direction of the thickness thereof as well as being laterally extensible whereby said covering may be stretched and otherwise made to conform with the configuration of the surface to which it is applied and attached to such surface without tearing.

7. A decorative covering comprising a vinyl plastic sheeting, a coloring medium for said sheeting which is visible from the wear surface side of said sheeting, and a flexible, elastic backing material for the other surface of said sheeting; said backing material comprising a knitted cloth attached to said other surface by means of an elastic adhesive, the elastic characteristic of said adhesive being less than that of the inherent stretching characteristic of said knitted cloth due to elongation of the loops thereof, whereby upon application of a sufficient tearing stress to said covering, the adhesive bond in a limited region will fail so that the stress will be taken up by a plurality of threads of said knitted cloth elongated in said region.

8. A decorative covering comprising a plastic sheeting, a base coloring medium for said sheeting, a second, mistlike irregular color coat to produce an antique effect, both of which colors are visible from the wear surface side of said sheeting, and a flexible, elastic backing material for the other surface of said sheeting; said backing material comprising a knitted cloth attached to said other surface by means of an elastic adhesive, said elastic adhesive being provided with an aluminum reflective pigment to increase opacity and hence increase hiding power permitting a thinner color coat, the combined elastic characteristics of said backing material and said adhesive being sufficient to provide the additional characteristic of speedy and complete recovery to initial flat form upon removal of a shaping stress, and the elastic characteristic of said adhesive being less than that of the inherent stretching characteristic of said knitted cloth due to deformation of the loops thereof, whereby upon application of a sufficient tearing stress to said covering, the adhesive bond in a limited region will fail so that the stress will be taken up by a plurality of threads of said knitted cloth deformed in said region.

9. A decorative covering as set forth in claim 8, in which said plastic sheeting is a flexible vinyl sheeting, and is in the range of approximately .010" to .040", and the color and adhesive coats are all in the range of .002" to .005".

10. The method of forming a plastic sheet in which a resinous compound is formed into a clear, flat sheet form, spraying on the rear surface of the sheet a mist coating so as to provide color in spots or streaks, subsequently applying a basic color coat, positioning a threaded elastic fibrous backing material over the color coat while it is in a still tacky condition, applying a light controlled pressure to partially embed the threads of said elastic fibrous backing material in the tacky color coat, and finally removing any residual vapors or odors.

11. The method of making a plastic sheet which involves the steps of taking a vinyl resin compound and heating it, calendering and forming the heated compound into a clear, flat sheet form, embossing the calendered sheet on its face surface while it is still hot enough to emboss properly, spraying the calendered sheet on its rear surface with a mist or light coating so as to provide an antique effect by coloring in spots or streaks, applying a basic color coat thereover, subsequently applying a reflective pigmented adhesive coat, then laying a threaded elastic fibrous backing material over the adhesive coat while it is still in a tacky condition, applying a controlled pressure to partially embed the threads of the backing material in said tacky adhesive, drying said laminated vinyl sheet to remove any residual vapors, cleaning to remove any loose lint or dirt, and finally winding into rolls for shipment.

References Cited in the file of this patent
UNITED STATES PATENTS

| | | |
|---|---|---|
| 2,354,857 | Gits et al. | Aug. 1, 1944 |
| 2,396,125 | Price | Mar. 5, 1946 |
| 2,430,934 | Kemmler et al. | Nov. 18, 1947 |
| 2,455,777 | Jones | Dec. 7, 1948 |
| 2,511,703 | Ettl | June 13, 1950 |
| 2,533,976 | Teague | Dec. 12, 1950 |
| 2,562,711 | Gessler et al. | July 31, 1951 |
| 2,563,316 | De Sylva | Aug. 7, 1951 |
| 2,617,750 | Le Claire et al. | Nov. 11, 1952 |
| 2,696,452 | Trepp | Dec. 7, 1954 |
| 2,706,699 | Plansoen et al. | Apr. 19, 1955 |
| 2,714,559 | Sheffield et al. | Aug. 2, 1955 |